United States Patent
Palanki

(10) Patent No.: US 7,852,744 B2
(45) Date of Patent: Dec. 14, 2010

(54) METHOD AND APPARATUS FOR CHANNEL ESTIMATION IN A WIRELESS COMMUNICATION DEVICE

(75) Inventor: Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 11/866,371

(22) Filed: Oct. 2, 2007

(65) Prior Publication Data

US 2008/0123547 A1 May 29, 2008

Related U.S. Application Data

(60) Provisional application No. 60/827,912, filed on Oct. 3, 2006.

(51) Int. Cl.
H04L 5/04 (2006.01)
H04B 7/02 (2006.01)
H04W 4/00 (2009.01)
H04J 1/00 (2006.01)
H04B 1/10 (2006.01)
H03K 5/01 (2006.01)

(52) U.S. Cl. ........................ 370/204; 370/317; 370/332; 370/490; 375/144; 375/348

(58) Field of Classification Search ................. 375/267, 375/299, 144, 148, 347–350; 370/203–211, 370/328–338, 341–345, 431–442, 478–481; 455/450–453, 464, 7–24
See application file for complete search history.

(56) References Cited

U.S. PATENT DOCUMENTS

| 6,973,098 | B1 * | 12/2005 | Lundby et al. | 370/491 |
| 7,035,659 | B1 | 4/2006 | Yang | |
| 7,068,683 | B1 * | 6/2006 | Lundby et al. | 370/493 |
| 7,092,431 | B2 * | 8/2006 | Maeda et al. | 375/144 |
| 7,116,981 | B2 * | 10/2006 | Jeon et al. | 455/450 |
| 7,283,510 | B2 * | 10/2007 | Ito et al. | 370/346 |
| 7,403,557 | B2 * | 7/2008 | Pan et al. | 375/148 |
| 7,443,925 | B2 * | 10/2008 | Mehta et al. | 375/299 |
| 2004/0264604 | A1 * | 12/2004 | Malette et al. | 375/340 |
| 2005/0197079 | A1 | 9/2005 | Banister et al. | |
| 2007/0071145 | A1 * | 3/2007 | Perets | 375/346 |

FOREIGN PATENT DOCUMENTS

| WO | 01052425 | 7/2001 |
| WO | 02047408 | 6/2002 |

OTHER PUBLICATIONS

International Search Report—PCT/US07/080281, International Search Authority—European Patent Office—Apr. 28, 2008.
Written Opinion—PCT/US07/080281, International Search Authority—European Patent Office—Apr. 28, 2008.

* cited by examiner

*Primary Examiner*—Tri H Phan
(74) *Attorney, Agent, or Firm*—Stanton Braden

(57) ABSTRACT

The present disclosure provides a method and apparatus of channel estimation for a wireless communication system. A pilot signal energy is estimated based on received pilot symbols. An estimated traffic signal energy of the traffic signal symbols is estimated based on the received traffic signal symbols, the received pilot symbols and a noise estimate. A traffic to pilot ratio is estimated based on the pilot signal energy and the traffic signal energy.

22 Claims, 7 Drawing Sheets

METHOD AND APPARATUS FOR CHANNEL ESTIMATION IN A WIRELESS COMMUNICATION DEVICE

BACKGROUND

1. Field

The present disclosure relates to wireless communication systems, and more particularly to a method and apparatus for channel estimation in a wireless communication device.

2. Background

A wireless communication system can be described by the equation $$y_i = \sqrt{E_s} h_i x_i + n_i,$$

where xi is the transmitted symbol, hi, is the fade, or channel estimate, ni, the noise and yi is the received signal at time i. Es is the signal power and N0 is the noise power (E|ni|2).

The fades hi are not known to the receiver and need to be estimated. This is usually done by having transmitting known "pilot symbols" pi from which the receiver can estimate hi.

$$z_j = \sqrt{E_p} h_j p_j + n_j$$

The process of estimating hj from the corrupted pilot symbols zj Is known as channel estimation.

In general, the power Ep at which the pilot symbols are transmitted differs form the power Es as which the data symbols are transmitted. The ratio Es/Ep is known as the Traffic-to-Pilot ratio or T/P ratio.

Often the T/P ratio is not known to the receiver. Furthermore, it can vary from time to time and from user to user in a multi-user system. This could occur for instance when the transmitter is employing power control. However, the receiver needs to know Es accurately to be able to correctly demodulate the received signal and recover the transmitted data accurately.

One option is to transmit the value of the T/P ratio over an overhead control channel. However, this is expensive in terms of overhead channel bandwidth. It would be beneficial if the receiver could estimate the traffic energy from the received data yi. Estimating the T/P ratio is called T/P estimation or traffic energy estimation.

An example of a communication system that can benefit from T/P estimation is an orthogonal frequency division multiple access (OFDMA) system. An OFDMA system utilizes orthogonal frequency division multiplexing (OFDM), which effectively partitions the overall system bandwidth into a number of (N) orthogonal frequency subbands. These subbands are also referred to as tones, sub-carriers, bins, frequency channels, and so on. Each subband is associated with a respective sub-carrier that may be modulated with data. An OFDMA system may use any combination of time, frequency, and/or code division multiplexing.

For an OFDMA system, multiple "traffic" channels may be defined whereby (1) each subband is used for only one traffic channel in any given time interval and (2) each traffic channel may be assigned zero, one, or multiple subbands in each time interval. The traffic channels may include "data" channels used to send traffic/packet data and "control" channels used to send overhead/control data. The traffic channels may also be referred to as physical channels, transport channels, or some other terminology.

The traffic channels for each sector may be defined to be orthogonal to one another in time and frequency so that no two traffic channels use the same subband in any given time interval. This orthogonality avoids intra-sector interference among multiple transmissions sent simultaneously on multiple traffic channels in the same sector. Some loss of orthogonality may result from various effects such as, for example, inter-carrier interference (ICI) and inter-symbol interference (ISI).

In a wireless communication system such as the OFDMA system, it is often necessary to estimate the response of a wireless channel from a transmitter to a receiver. The channel estimate may be used for various purposes such as data detection, time synchronization, frequency correction, spatial processing, rate selection, and so on. Channel estimation is typically performed by transmitting a pilot signal containing pilot symbols that are known a priori by both the transmitter and receiver.

The pilot signal is typically impaired by both noise and interference. These impairments degrade the quality of the channel estimate obtained by the receiver based on the received pilot signal. The noise can come from various sources such as the wireless channel, receiver properties, and so on. Noise impairment can normally be addressed by transmitting the pilot signal in a proper manner and/or for a sufficient period of time such that the receiver can obtain the desired quality for the channel estimate. The interference can result from multiple transmitters transmitting their pilot signals simultaneously. These transmitters may be for different base stations in the system, different antennas of the same base station, and so on. The pilot signal from each transmitter may act as interference to the pilot signals from other transmitters. This pilot interference degrades the quality of the channel estimate.

It is often desired to estimate the channel and the level of interference. On the forward link (FL), common pilot symbols are known to have been used. In the OFDMA system, such common pilot symbols are typically scattered over the entire bandwidth shared by all the users. In a traditional single-antenna transmission, such common pilot symbols may be exploited by all the users for the purpose of FL channel estimation. The bandwidth and channel coherence time values that are typical in cellular applications render common pilot tones particularly useful.

The relative bandwidth efficiency of the common pilot versus dedicated pilot may be made by a comparison between the total number of degrees of freedom in a broadband channel corresponding to the total shared bandwidth, estimated with the common pilot, and the number of degrees of freedom in a narrow-band sub-channel allocated per user times the number of such narrow-band sub-channels. For bandwidth and channel coherence time values that are typical in cellular applications, this balances in favor of the common pilot. Nevertheless, the dedicated pilot approach has a number of attractive features.

SUMMARY

In one aspect, the present disclosure provides a method of channel estimation for a wireless communication system including receiving pilot symbols; receiving traffic signal symbols; estimating a pilot signal energy based on the received pilot symbols; estimating an estimated traffic signal energy of the traffic signal symbols based on the received traffic signal symbols, the received pilot symbols and a noise estimate; and determining a traffic to pilot ratio based on the pilot signal energy and the traffic signal energy. The method may include computing a total received energy. The method may include computing a sum of absolute values of received traffic signal symbols squared minus the noise estimate. The method may include computing a weighted mean of a received energy. The method may include computing a sum of absolute values of received traffic signal symbols squared minus the noise estimate. The method may include estimating an estimated maximum likelihood traffic signal energy of the traffic signal symbols based on the received traffic signal symbols, the received pilot symbols and the noise estimate.

In an additional aspect, the present disclosure provides an apparatus of channel estimation for a wireless communication system. The apparatus includes a processor, which is configured to receive pilot symbols; receive traffic signal symbols; estimate a pilot signal energy based on the received pilot symbols; estimate an estimated maximum likelihood traffic signal energy of the traffic signal symbols based on the received traffic signal symbols, the received pilot symbols and a noise estimate; and determine a traffic to pilot ratio based on the pilot signal energy and the traffic signal energy. The apparatus further includes a memory coupled to the processor.

In a further aspect, the present disclosure provides a computer program product, which includes a computer-readable medium. The computer-readable medium includes code for code for receiving pilot symbols; code for receiving traffic signal symbols; code for estimating a pilot signal energy based on the received pilot symbols; code for estimating an estimated maximum likelihood traffic signal energy of the traffic signal symbols based on the received traffic signal symbols, the received pilot symbols and a noise estimate; and code for determining a traffic to pilot ratio based on the pilot signal energy and the traffic signal energy.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

In certain aspects, the present disclosure provides a simplified channel and interference estimation algorithm, which may be applied to fast-time varying channels and to two or more users/layers sharing the same pilot tones. In certain aspects, scrambling of the pilot symbols may be changed. The simplified channel estimation algorithm, which, for vehicular channels and multiple users/layers, may bring a noticeable performance improvement.

Figure 1:
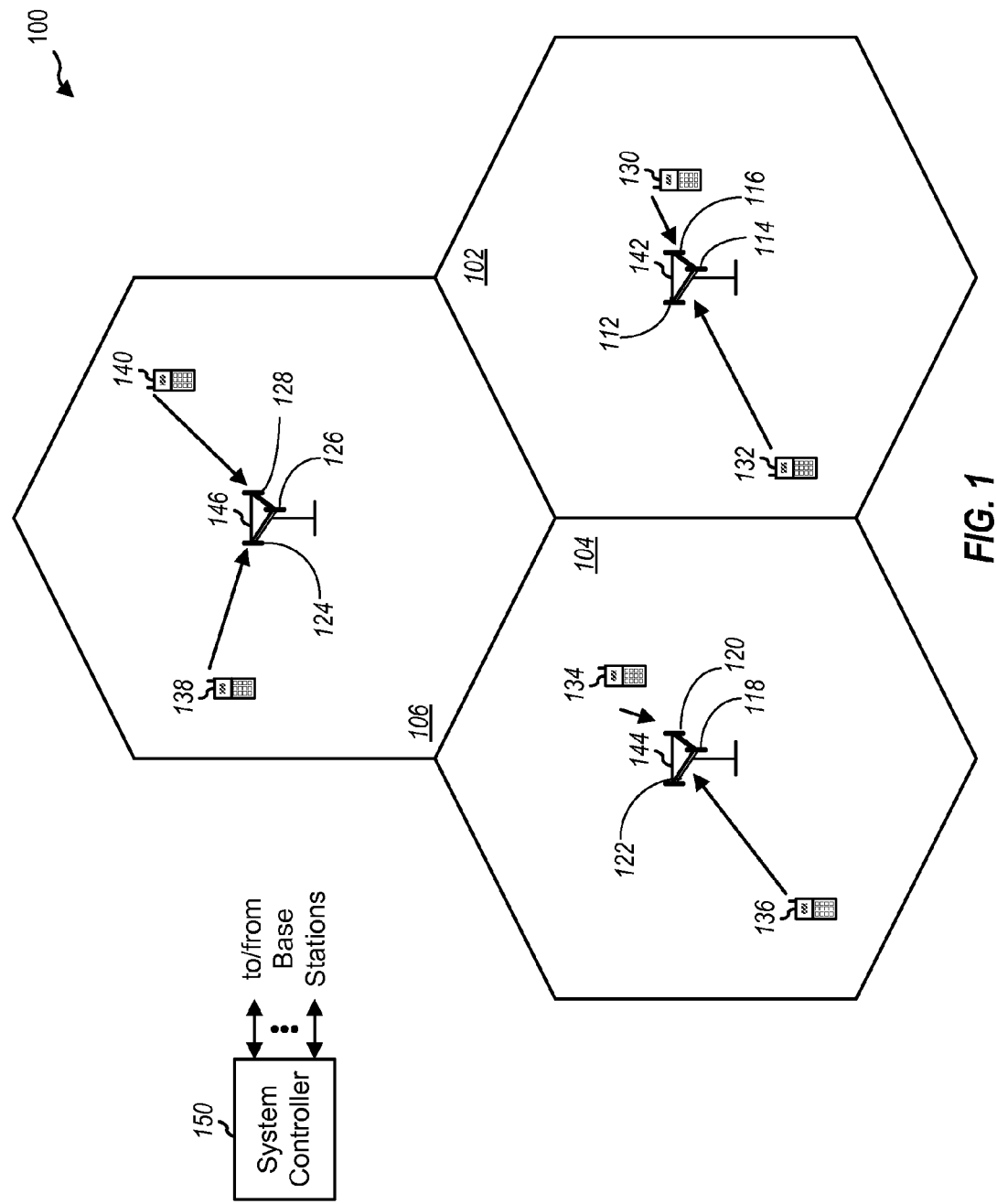
FIG. 1 illustrates an exemplary multiple access wireless communication system.

Referring to FIG. 1, a multiple access wireless communication system 100 according to one aspect of the present disclosure is illustrated. The present user power offset estimation method may be implemented in the system 100. The multiple access wireless communication system 100 includes multiple access points 142, 144 and 146. An access point provides communication coverage for a respective geographic area. An access point and/or its coverage area may be referred to as a "cell", depending on the context in which the term is used. For example, the multiple access wireless communication system 100 includes multiple cells 102, 104, and 106. To increase capacity, the coverage area of each access point may be partitioned into multiple (e.g., three) sectors. The multiple sectors may be formed by groups of antennas, each responsible for communication with access terminals in a portion of the cell. For example, in the cell 102, antenna groups 112, 114, and 116 each correspond to a different sector, in the cell 104, antenna groups 118, 120, and 122 each correspond to a different sector, and in the cell 106, antenna groups 124, 126, and 128 each correspond to a different sector.

In each cell one or more access terminals may be in communication with one or more sectors of each access point. For example, access terminals 130 and 132 are in communication with the access point 142, access terminals 134 and 136 are in communication with the access point 144, and access terminals 138 and 140 are in communication with the access point 146.

For a centralized architecture, a system controller 150 couples to the access points 142, 144 and 146, provides coordination and control for these access points, and further controls the routing of data for the terminals served by these access points. For a distributed architecture, the access points may communicate with one another as needed, e.g., to serve a terminal in communication with an access points, to coordinate the usage of subbands, and so on.

As shown in FIG. 1, the access terminals 130, 132, 134, 136, 138, and 140 are each located in a different portion of its respective cell, relative to each other access terminal in the same cell. Further, each access terminal may be at a different distance from the corresponding antenna groups with which it is communicating. Both of these factors provide situations, due to environmental and other conditions in the cell, which may cause different channel conditions to be present between each access terminal and the corresponding antenna group with which it is communicating.

As used herein, an access point (AP) may be a fixed station used for communicating with the terminals and may also be referred to as, and include some or all the functionality of, a base station, a Node B, or some other terminology. An access terminal (AT) may also be referred to as, and include some or all the functionality of, a user equipment (UE), a wireless communication device, a terminal, a mobile station or some other terminology.

Figure 2:
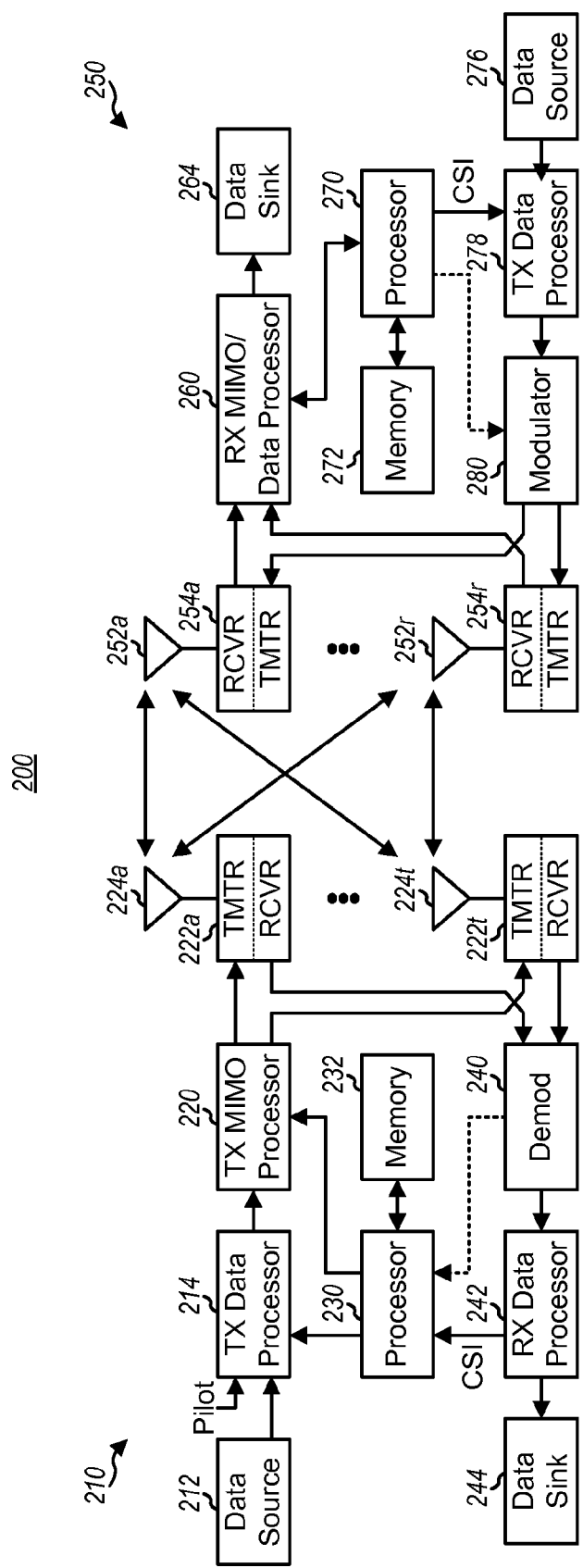
FIG. 2 illustrates an exemplary transmitter and an exemplary receiver in a multiple access wireless communication system.

Referring to FIG. 2, a transmitter system 210 and a receiver system 250 in a multiple access wireless communication system 200 in accordance with an aspect of the present disclosure are illustrated. The present channel estimation method may be implemented in the system 200. At the transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. In some embodiments, TX data processor 214 applies precoding weights to the symbols of the data streams based upon the user and the antenna from which the symbols are being transmitted. In some embodiments, the precoding weights may be generated based upon an index to a codebook generated at a transceiver 254 and provided as feedback to a transceiver 222 which has knowledge of the codebook and its indices. Further, in those cases of scheduled transmissions, the TX data processor 214 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by the processor 230. As discussed above, in some embodiments, the packet format for one or more streams may be varied according to the rank information that is transmitted from the user.

The modulation symbols for all data streams are then provided to a TX MIMO processor 220, which may further process the modulation symbols (e.g., for OFDM). TX MIMO processor 220 then provides $N_T$ modulation symbol streams to $N_T$ transceivers (TMTR) 222a through 222t. In certain embodiments, TX MIMO processor 220 applies precoding weights to the symbols of the data streams based upon the user to which the symbols are being transmitted to and the antenna from which the symbol is being transmitted from that user channel response information.

Each transceiver 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 222a through 222t are then transmitted from $N_T$ antennas 224a through 224t, respectively. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

At the receiver system 250, the transmitted modulated signals are received by $N_R$ antennas 252a through 252r and the received signal from each antenna 252 is provided to a respective transceiver (RCVR) 254. Each transceiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ transceivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 260 is complementary to that performed by TX MIMO processor 220 and TX data processor 214 at the transmitter system 210.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides estimated channel state information (CSI), which may comprise various types of information regarding the communication link and/or the received data stream. For example, the CSI may comprise only the operating SNR. The CSI is then processed by a TX data processor 278, which also receives traffic data for a number of data streams from a data source 276, modulated by a modulator 280, conditioned by transceivers 254a through 254r, and transmitted back to the transmitter system 210.

At the transmitter system 210, the modulated signals from the receiver system 250 are received by antennas 224, conditioned by receivers 222, demodulated by a demodulator 240, and processed by a RX data processor 242 to recover the CSI reported by the receiver system. The reported quantized information, e.g. CQI, is then provided to processor 230 and used to (1) determine the data rates and coding and modulation schemes to be used for the data streams, and (2) to generate various controls for TX data processor 214 and TX MIMO processor 220.

1. System Model

Generally, the transmission bandwidth may be divided into hop regions. The symbols of one hop region are assigned to multiple users and are processed together by the AT or AP for the multiple users assigned to the hop region. One hop region includes the symbols transmitted in $N_S$ successive OFDM symbols over the same contiguous set of $N_T$ tones. Thus, there are $N_S \times N_T$ symbols in one hop region. The hop region is also referred to as a time-frequency region. Depending on the context, a time-frequency region may be a tile or a subtile.

In certain aspects, there may be Q users that share one hop region. The term "user" is transposable with the term "layer" as used herein in the forward link. In this aspect, a single terminal may correspond to multiple users, as it may transmit multiple streams if it has multiple transmit antennas. However, in some cases, each terminal may only transmit a single layer and thus be one user.

The vector of received symbols in one hop region, denoted by y, is an $N_S N_T \times 1$ vector of complex numbers, given by $$y = \sum_{q=1}^{Q} \Delta_q h^{(q)} \cdot S^{(q)} + n_0 \quad (1)$$

where the first $N_T$ elements of y (and all the other vectors in the equation (1)) correspond to the channel for the tones of the first OFDM symbol, and so on. $\Delta_q^2$, where $q=1, \ldots, Q$, is the power offset of user q, which is assumed known. User power offset gives the average received power of the signal when the transmitted signal has unit power. $S^{(q)}$, where $q=1, \ldots, Q$, $N_S N_T \times 1$ vector of complex numbers, is the vector of modulation symbols transmitted by user q within one hop region. $h^{(q)}$, $q=1, \ldots, Q$, $N_S N_T \times 1$ vector of complex numbers, is the frequency domain channel of user q. The channel coefficients $h^{(q)}$ may be assumed independent among users. For each user, $h^{(q)}$ is generally considered a complex Gaussian function, with a zero mean and a known covariance matrix. $n_0$, $N_S N_T \times 1$ vector of complex numbers, is the CAWGN (which includes the interference), and is assumed to have a zero mean and a covariance matrix $\sigma^2 I$. The noise variance $\sigma^2$ is unknown.

In some aspects, the present system model may be used to estimate the channel coefficients of all users and the interference. For this, dedicated pilot symbols are inserted among the data symbols in a given hop region. The estimation may be based on the received pilot symbols and on the knowledge of the statistical properties of the channel.

1.1 Channel Model

The statistical properties of the channel are assumed known. For each user, the channel coefficients over one hop region may be assumed to be correlated. If this is the case, the following approximations may be accurate enough to be utilized for channel estimation.

1.1.1 Structure of Channel Covariance Matrix

Practically, the structure of the channel covariance matrix of one user has at most three significant eigenvalues, and the corresponding eigenvectors can be approximated by analytical expressions:

$$E\{h^{(q)}h^{(q)H}\} \approx \sum_{i=1}^{3} \Lambda_i^{(q)} U_i U_i^H \quad (2)$$

where $U_1$, $U_2$, $U_3$ are explained below.

The following definition of the Kronecker product may be utilized in approximating the covariance matrix. Given the vectors $a_{n\times 1}$ and $b_{m\times 1}$, their Kronecker product $C_{mn\times 1} := a_{n\times 1} \otimes b_{m\times 1}$ is defined as:

$$c := \begin{bmatrix} a_1 b \\ a_2 b \\ \vdots \\ a_n b \end{bmatrix} = [a_1 b_1, a_1 b_2, \ldots, a_1 b_m, a_2 b_1, a_2 b_2, \ldots, a_2 b_m, \ldots, a_n b_1, a_n b_2, \ldots, a_n b_m]^T \quad (3)$$

Further the following vectors may be defined:

$$U_{N_s,0} := \frac{1}{\sqrt{N_s}}[1, \ldots 1]^T \quad N_s \times 1 \text{ Vector} \quad (4)$$

$$U_{N_s,1} := \sqrt{\frac{3}{N_s(N_s^2 - 1)}} [-(N_s-1) : 2 : (N_s-1)]^T \quad N_s \times 1 \text{ vector} \quad (5)$$

$$U_{N_t,0} := \frac{1}{\sqrt{N_t}}[1, \ldots 1]^T \quad N_t \times 1 \text{ vector} \quad (6)$$

$$U_{N_t,1} := \sqrt{\frac{3}{N_t(N_t^2 - 1)}} [-(N_t-1) : 2 : (N_t-1)]^T \quad N_t \times 1 \text{ vector} \quad (7)$$

The following 3 vectors of size $N_s N_t \times 1$ are called approximative eigenvectors and they are used instead of the real eigenvectors for the estimation of the channel corresponding to the data symbols:

$$U_1 := U_{N_s,0} \otimes U_{N_t,0}; \quad U_2 := U_{N_s,0} \otimes U_{N_t,1};$$
$$U_3 := U_{N_s,1} \otimes U_{N_t,0}.$$

In some aspects, it may be that the first eigenvalue is at least one order of magnitude larger than the other two. The structure of the covariance matrix described previously may be utilized to provide the following approximate representation of the channel.

1.1.2 Taylor Approximation of Channel Function

The channel of each user over the hop region may be written as a random function of time and frequency $\xi^{(q)}(t, f)$. Then, $\xi^{(q)}(t, f)$ can be approximated accurately by the first three terms of the Taylor series expansion:

$$\xi^{(q)}(t, f) \approx \xi^{(q)}(t_0, f_0) + \frac{\partial \xi^{(q)}(t, f)}{\partial f}\bigg|_{(t_0, f_0)} (f - f_0) + \frac{\partial \xi^{(q)}(t, f)}{\partial t}\bigg|_{(t_0, f_0)} (t - t_0) \quad (8)$$

Thus, in this approximation, the channel over one hop region may be characterized by three complex parameters.

If $(t_0, f_0)$ is defined to be the center of symmetry of the hop region, the channel of one user corresponding to a symbol of coordinates $(n_S, n_T)$ may be written as follows:

$$h^{(q)}(n_S, n_T) \leq \alpha^{(q)} + \beta_F^{(q)}(n_T - n_{T0}) + \beta_T^{(q)}(n_S - n_{S0}) \quad (9)$$

where $n_{T0} := (N_T + 1)/2$ and $n_{S0} := (N_S + 1)/2$ are the coordinates of the center of the hop region, $\alpha^{(q)}$ is the DC component, and $\beta_F^{(q)}$, $\beta_T^{(q)}$ are the slopes in frequency and time, respectively.

1.2 Pilot Insertion Scheme

Dedicated pilots may be used. The following describes a dedicated pilot scheme, for example. However, common pilots could also be used.

Figure 3A:
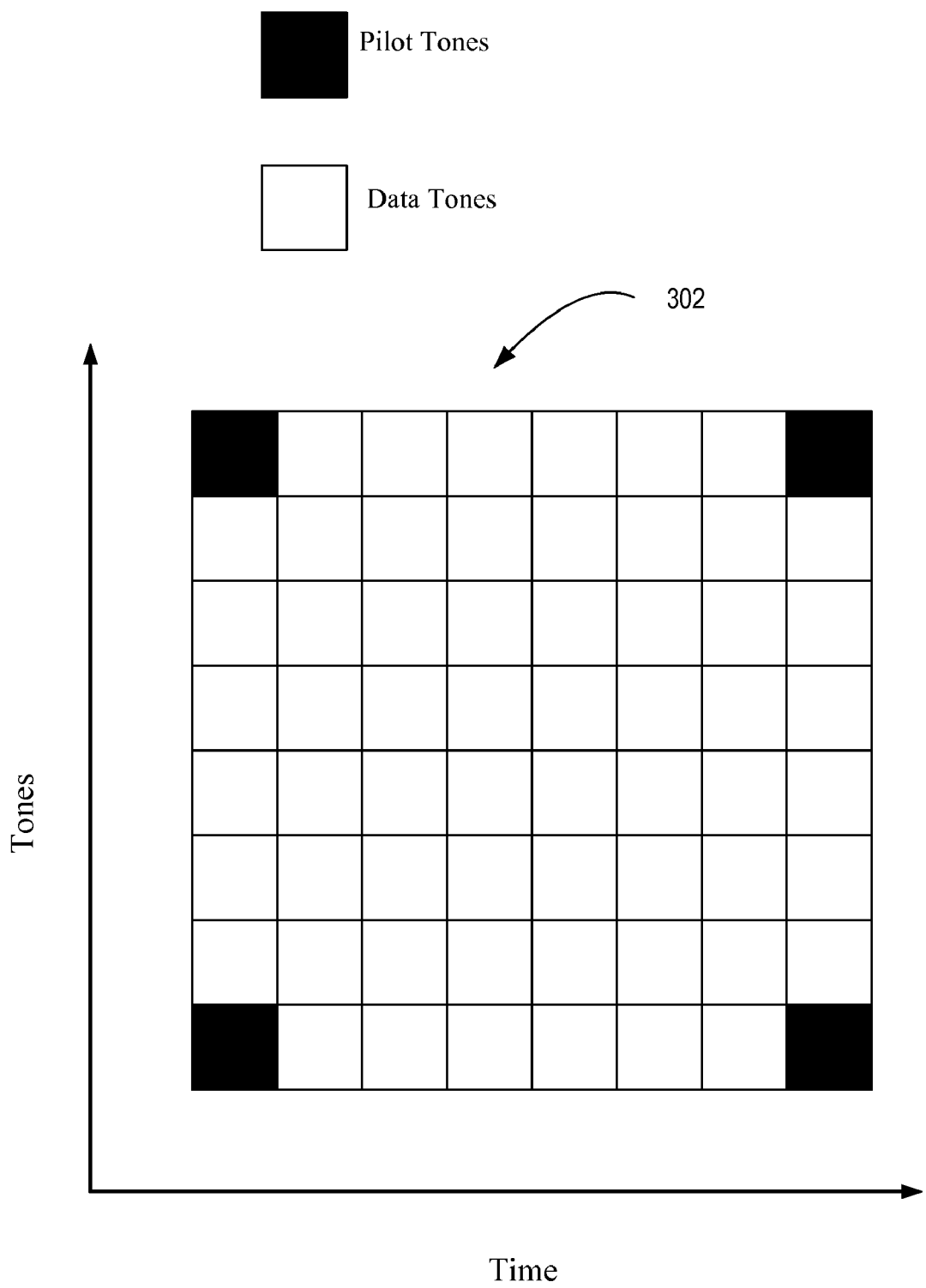
FIGS. 3A, 3B and 3C show dedicated pilot symbols disposed among data symbols in a time-frequency region in accordance with exemplary aspects of the present disclosure.
Figure 3B:
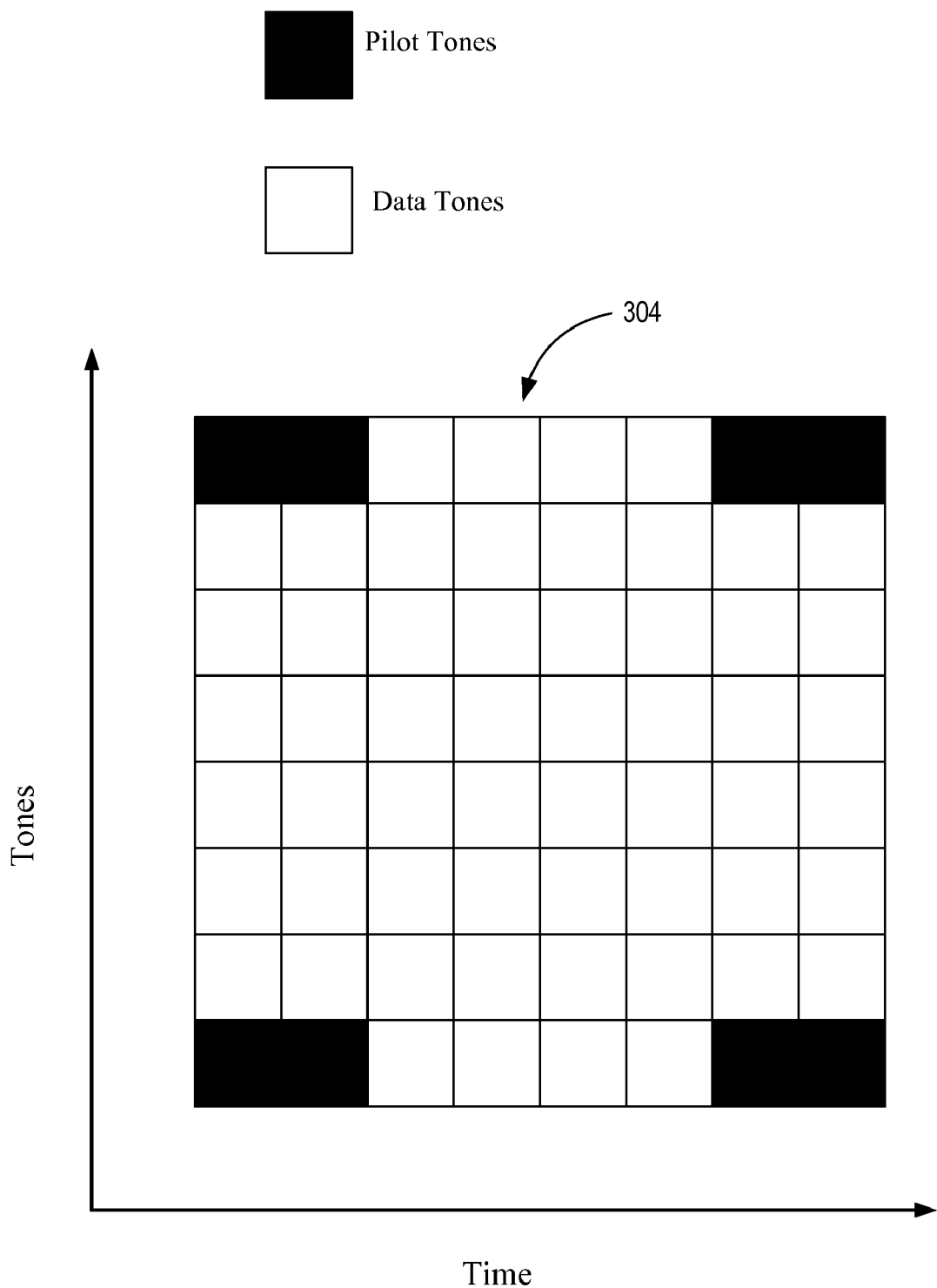
Figure 3C:
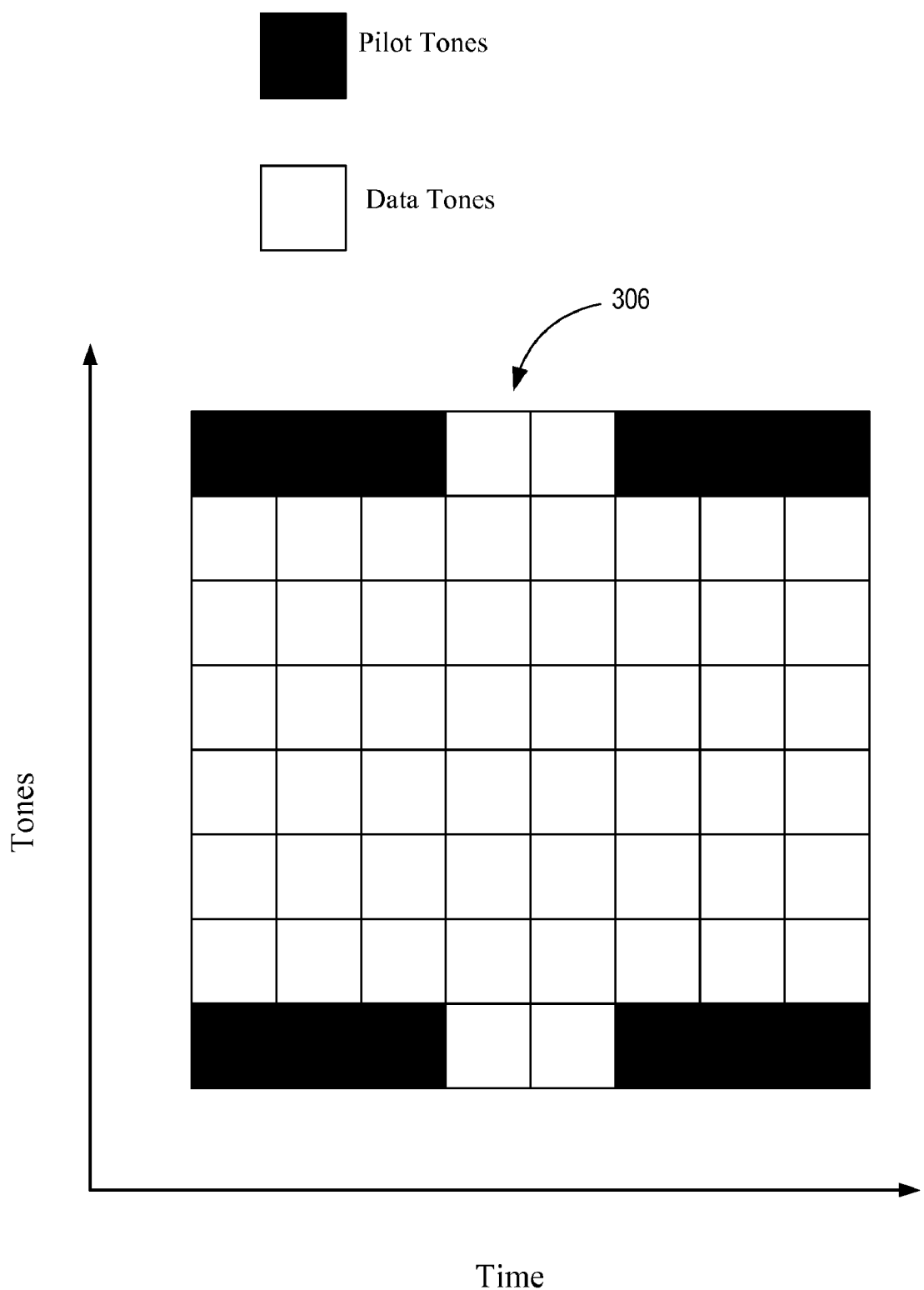
Figure 4:
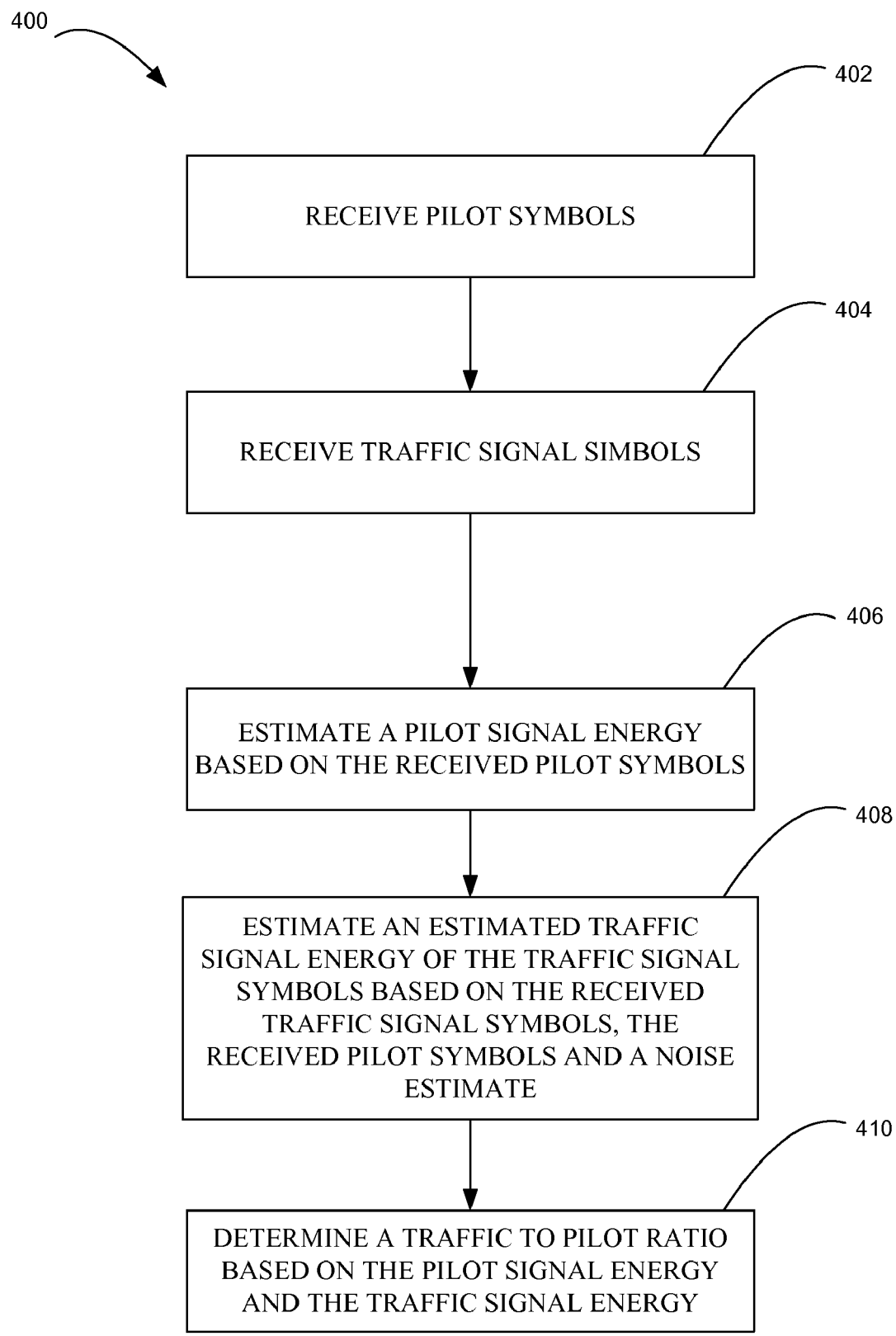
FIG. 4 is a flowchart of an exemplary method of channel estimation for a wireless communication system according to one aspect of the present disclosure.

In one aspect, pilot symbols within a hop region are placed in a pattern that satisfies the following conditions: (1) there are a total of $N_P$ pilot symbols in one hop region; (2) the pilot symbols are grouped in 4 clusters, each cluster having $M_Q$ symbols; thus $N_P = 4M_Q$; (3) the pilot symbols of one cluster occupy a contiguous region in the time-frequency domain, such that, for each user, the variations of the channel within the symbols of one cluster are as small as possible; and (4) the pilot placement scheme is symmetric with respect to the center of symmetry of the hop region. In certain aspects, the number of users that share one hop region does not exceed the cluster size: $Q \leq M_Q$. FIGS. 3A, 3B, and 3C show dedicated pilot symbols disposed among data symbols in a time-frequency region in accordance with exemplary aspects of the present disclosure. As shown in FIG. 3A, 4 pilot symbols in 4 clusters are dispersed among 60 data tones in an 8×8 subtile 302, where $N_P = 4$, and $M_Q = 1$. Referring to FIG. 3B, 8 pilot symbols in 4 clusters are dispersed among 56 data tones in an 8×8 subtile 304, where $N_P = 8$, and $M_Q = 2$. As shown in FIG. 3C, 12 pilot symbols in 4 clusters are dispersed among 52 data tones in an 8×8 subtile 306, where $N_P = 12$, and $M_Q = 3$.

To allow multiplexing, the pilot symbols of one user that belong to the same cluster are scrambled with a scrambling sequence; for simplicity, each user uses the same scrambling sequence for all clusters. The scrambling sequences of different users are orthogonal vectors of length $M_Q$ and are assumed to have unit modulus elements. There can be at most $M_Q$ such sequences, denoted by $s_k$, k=1, . . . , $M_Q$.

The $N_P \times 1$ vector of pilot symbols transmitted by user q can be written as:

$$r_{1,q} := \frac{1}{\sqrt{N_P}} 1_{4\times 1} \otimes s_q \quad (10)$$

where $1_{N_C \times 1}$ is a column vector with $N_C$ ones and $\otimes$ denotes the Kronecker product. The vectors $r_{1,q}$, q=1, ..., Q, are orthonormal. Define the following $N_P \times 1$ complex vectors $r_{i,q}$, i=1, ..., 4, q=1, ..., $M_Q$.

$$r_{i,q} := \frac{1}{\sqrt{N_P}} \alpha_i \otimes s_q \tag{11}$$

with $$\alpha_1 := \begin{bmatrix} 1 \\ 1 \\ 1 \\ 1 \end{bmatrix}, \alpha_2 := \begin{bmatrix} -1 \\ -1 \\ 1 \\ 1 \end{bmatrix}, \alpha_3 := \begin{bmatrix} -1 \\ 1 \\ -1 \\ 1 \end{bmatrix}, \alpha_4 := \begin{bmatrix} 1 \\ -1 \\ -1 \\ 1 \end{bmatrix}$$

The fact that, for each cluster, the scrambling sequences of users are orthogonal plays a role in the derivation of the algorithm.

2. Channel & Interference Estimation Algorithm with Embedded Power Offset estimation

2.1 Interference Estimation

In one aspect, the information about the power of the interference is obtained using only the received pilot symbols. The observation space has $N_P$ dimensions, and the channel of each user is given by three parameters. Thus, the remaining $N_P-3Q$ dimensions of the observation space may be used to obtain information about the power of the interference. Thus, in FIG. 3A, $N_P-3Q$ (i.e., 4-3=1) dimension of the observation space may be used to obtain information about the power of the interference; in FIG. 3B, $N_P-3Q$ (i.e., 8-6=2) dimensions of the observation space may be used to obtain information about the power of the interference; and in FIG. 3C, $N_P-3Q$ (i.e., 12-9=3) dimensions of the observation space may be used to obtain information about the power of the interference.

The interference is estimated as the power of the projection of the received signal on the dimensions unoccupied by the transmitted pilot signals. In other words, the received signal x is projected onto the basis $r_{i,q}$, i=1, ..., 4, q=1, ..., $M_Q$ defined in Equation (11), and the power of the components corresponding to the interference is summed. If a despreading term $w_{i,q}$ is defined as $$w_{i,q} := r_{i,q}^H x \tag{12}$$

the power of the interference may be estimated by averaging the power of the samples obtained:

$$\hat{\sigma}^2 = \frac{1}{4M_Q - 3Q} \left( \sum_{q=1}^{Q} |w_{4,q}|^2 + \sum_{i=1}^{4} \sum_{q=Q+1}^{M_Q} |w_{i,q}|^2 \right) \tag{13}$$

The first sum may be an estimate of the noise power if the channel of each user has perfect linear variation in a tile. In practice, however, it includes the channel modeling error. The second sum exists only if $Q < M_Q$, and is the power of the received signal despreaded with spreading sequences orthogonal on the sequences of the transmitting users.

2.2 Channel Estimation

In one aspect, the channel estimates are given by an approximation to the MMSE estimator:

$$\hat{h}^{(q)} = E\{h^{(q)} x^H\}(E\{xx^H\})^{-1} x \tag{14}$$

The following may be obtained:

$$\Delta_q \hat{h}^{(q)} = \sum_{i=1}^{3} \frac{\Delta_q^2 \Lambda_i^{(q)} \beta_i}{\Delta_q^2 \Lambda_i^{(q)} \beta_i^2 + \hat{\sigma}^2} w_{i,q} U_i \tag{15}$$

The quantities $\beta_i$ are provided as follows:

$$\beta_1 := \left( \sqrt{\frac{N_S N_T}{N_P}} \right)^{-1} \tag{16}$$

$$\beta_2 := \left( \sqrt{\frac{N_S N_T (N_T^2 - 1)}{3 N_P}} \frac{1}{N_T - \theta_T} \right)^{-1} \tag{17}$$

$$\beta_3 := \left( \sqrt{\frac{N_S N_T (N_S^2 - 1)}{3 N_P}} \frac{1}{N_S - \theta_S} \right)^{-1} \tag{18}$$

The values $\theta_T$ and $\theta_S$ are obtained from the actual placement of the pilot symbols, and they identify the center of the clusters of pilot symbols within a tile. More exactly, the center of the upper-left cluster of pilot symbols may be given by $$\left( \frac{\theta_S + 1}{2}, \frac{\theta_T + 1}{2} \right).$$

If the pilot symbols are placed in the top "row", then $\theta_T=1$, if they are in the second "row", then $\theta_T=3$, and so on.

2.2.1 An Effect (Cross-interference)

One assumption used in the conventional channel estimation algorithm is that the channel of each user is constant for the pilot symbols of each cluster. The despreading term $w_{i,q}$ that appears in the expression of channel estimate may be computed as follows:

$$w_{i,q} := r_{i,q}^H x = r_{i,q}^H \left[ \sum_{k=1}^{Q} \Delta_k h^{(k)} \cdot r_{1,k} + n_0 \right] = r_{i,q}^H \sum_{k=1}^{Q} \Delta_k h^{(k)} \cdot r_{1,k} + r_{i,q}^H n_0 \tag{19}$$

If the despreading is perfect, no contribution from other users appears in the expression of the despreading term $w_{i,q}$. The contribution from other users may be given by the sum of terms $$n_{i,q,k} := r_{i,q}^H (h^{(k)} \cdot r_{1,k}) \tag{20}$$

where k≠q

First, the channel of each user may be expressed using the Taylor approximation given previously:

$$h^{(q)}(n_S, n_T) \approx \alpha^{(q)} + \beta_F^{(q)}(n_T - n_{T0}) + \beta_T^{(q)}(n_S - n_{S0}) \tag{21}$$

-continued $$h^{(q)} \approx \alpha^{(q)} 1_{4M_Q \times 1} + 2\beta_F^{(q)}(n_T - n_{T0})\left(\begin{bmatrix} -1 \\ -1 \\ 1 \\ 1 \end{bmatrix} \otimes 1_{M_Q \times 1}\right) + 2\beta_T^{(q)} \eta_q \quad (22)$$

$$h^{(q)} \approx \alpha^{(q)} \alpha_1 \otimes 1_{M_Q \times 1} + 2\beta_F^{(q)}(n_T - n_{T0})(\alpha_2 \otimes 1_{M_Q \times 1}) + 2\beta_T^{(q)} \eta_q \quad (23)$$

For the placement represented in FIG. 3C, the vector $\eta_q$ is given as follows:

$$\eta_q = \begin{bmatrix} 1 \\ 1 \end{bmatrix} \otimes \left(\begin{bmatrix} -7 \\ -5 \\ -3 \\ 3 \\ 5 \\ 7 \end{bmatrix}\right) = \begin{bmatrix} 1 \\ 1 \end{bmatrix} \otimes \left(\begin{bmatrix} -5 \\ -5 \\ -5 \\ 5 \\ 5 \\ 5 \end{bmatrix}\right) + \begin{bmatrix} 1 \\ 1 \end{bmatrix} \otimes \left(\begin{bmatrix} -2 \\ 0 \\ 2 \\ -2 \\ 0 \\ 2 \end{bmatrix}\right) = \quad (24)$$

$$5\alpha_3 \otimes 1_{M_Q \times 1} + \begin{bmatrix} 1 \\ 1 \end{bmatrix} \otimes \begin{bmatrix} -2 \\ 0 \\ 2 \\ -2 \\ 0 \\ 2 \end{bmatrix}$$

Next, the terms $n_{i,q,k} := r_{i,q}^H(h^{(k)} \cdot r_{1,k})$ may be computed as follows.

$$r_{i,q} := \frac{1}{\sqrt{N_P}} \alpha_i \otimes s_q \quad (25)$$

with $$\alpha_1 := \begin{bmatrix} 1 \\ 1 \\ 1 \\ 1 \end{bmatrix}, \alpha_2 := \begin{bmatrix} -1 \\ -1 \\ 1 \\ 1 \end{bmatrix}, \alpha_3 := \begin{bmatrix} -1 \\ 1 \\ -1 \\ 1 \end{bmatrix}, \alpha_4 := \begin{bmatrix} 1 \\ -1 \\ -1 \\ 1 \end{bmatrix}.$$

$$\sqrt{N_P} h^{(q)} \cdot r_{1,q} \approx \alpha^{(q)}(\alpha_1 \otimes s_q) + 2\beta_F^{(q)}(n_T - n_{T0})(\alpha_2 \otimes s_q) + 2\beta_T^{(q)} p_q \quad (26)$$

For the placement represented in FIG. 3C, the vector $P_q$ is given by $$p_q = \begin{bmatrix} 1 \\ 1 \end{bmatrix} \otimes \quad (27)$$

$$\left(\begin{bmatrix} -7 \\ -5 \\ -3 \\ 3 \\ 5 \\ 7 \end{bmatrix} \cdot \begin{bmatrix} s_q \\ s_q \end{bmatrix}\right) = \begin{bmatrix} 1 \\ 1 \end{bmatrix} \otimes \left(\begin{bmatrix} -5 \\ -5 \\ -5 \\ 5 \\ 5 \\ 5 \end{bmatrix} \cdot \begin{bmatrix} s_q \\ s_q \end{bmatrix}\right) + \begin{bmatrix} 1 \\ 1 \end{bmatrix} \otimes \left(\begin{bmatrix} -2 \\ 0 \\ 2 \\ -2 \\ 0 \\ 2 \end{bmatrix} \cdot \begin{bmatrix} s_q \\ s_q \end{bmatrix}\right) =$$

$$5\alpha_3 \otimes s_q + \begin{bmatrix} 1 \\ 1 \end{bmatrix} \otimes \left(\begin{bmatrix} -2 \\ 0 \\ 2 \\ -2 \\ 0 \\ 2 \end{bmatrix} \cdot \begin{bmatrix} s_q \\ s_q \end{bmatrix}\right)$$

The last term in the expression (27) is denoted by $\theta_q$:

$$\theta_q := p_q - 2(n_{T_1} - n_{T_0})(\alpha_3 \otimes s_q) = \alpha_1 \otimes \xi_q \quad (28)$$

with $$\xi_q := \begin{bmatrix} -2 \\ 0 \\ 2 \end{bmatrix} \cdot s_q,$$

and $n_{T_1}$ as the time-domain index of the symmetry center of the upper right cluster of training symbols. For the placement in FIG. 3C, $n_{T_1}=7$, and $n_{T_0}=4.5$.

$$N_P n_{i,q,k} = N_P r_{i,q}^H (h^{(k)} \cdot r_{1,k})$$
$$= \alpha^{(k)}(\alpha_i^H \alpha_1)(s_q^H s_k) + 2\beta_F^{(k)}(n_T - n_{T0})(\alpha_i^H \alpha_2)(s_q^H s_k) +$$
$$2\beta_T^{(q)}(n_S - n_{S0})(\alpha_i^H \alpha_3)(s_q^H s_k) + 2\beta_T^{(q)}(\alpha_i^H \otimes s_q^H)\theta_k$$

Using the orthogonality of the vectors involved:

$$s_q^H s_k = \delta_{q,k}, \quad \alpha_i^H \alpha_k = 4\delta_{i,k} \quad (29)$$

then $$N_P n_{i,q,k} = 2\beta_T^{(q)}(\alpha_i^H \otimes s_q^H)\theta_k$$
$$= 2\beta_T^{(q)}(\alpha_i^H \otimes s_q^H)(\alpha_1 \otimes \xi_k)$$
$$= 2\beta_T^{(q)}(\alpha_i^H \alpha_1)(s_q^H \xi_k)$$

Thus, for the current design of pilot symbols, the expression (29) above is not zero for 1 only.

In summary, for each user the variation in time of the channel of other users induces an error (bias) in the despreading terms.

2.2.2 A Correction Method (Keeping the Transmitter Unchanged)

In certain aspects, the present disclosure provides the following correction method.

First, the coefficients $\beta_T^{(q)}$ for all users are estimated. They can be derived by comparing the foregoing-described estimation formula (15)

$$\Delta_q \hat{h}^{(q)} = \sum_{i=1}^{3} \frac{\Delta_q^2 \Lambda_i^{(q)} \beta_i}{\Delta_q^2 \Lambda_i^{(q)} \beta_i^2 + \hat{\sigma}^2} w_{i,q} U_i \quad (15)$$

with the Taylor approximation:

$$\Delta_q \hat{\beta}_T^{(q)} = \frac{1}{2} \frac{\Delta_q^2 \Lambda_i^{(q)} \beta_i}{\Delta_q^2 \Lambda_i^{(q)} \beta_i^2 + \hat{\sigma}^2} w_{i,q} \sqrt{\frac{3}{N_s N_t (N_s^2 - 1)}} \quad (30)$$

Then, estimates of the error terms $\hat{n}_{i,q,k}$ are computed using the estimated coefficient or slopes $\hat{\beta}_T^{(q)}$ based on the foregoing described Formula (29).

Next, the estimated error terms $\hat{n}_{i,q,k}$ are used to correct the despreading terms $w_{i,q}$:

$$\tilde{w}_{i,q} := w_{i,q} - \sum_{k=1}^{Q} \hat{n}_{i,q,k} \quad (31)$$

The channel estimates are recomputed using $\tilde{w}_{i,q}$ instead of $w_{i,q}$ according to the foregoing-described formula (15).

3. Traffic-to-Pilot Ratio Estimation 3.1 Maximum Likelihood Under Gaussian Assumption Without loss of generality, the following discussion is based on an assumption that Ep=1. Under the assumption that Ep=1, the T/P ratio is equal to the traffic energy Es. Other values of Ep result in scaling of Es, but the ratio of Es/Ep does not change. A first algorithm can be used to find the value of Es by maximum likelihood estimation. The following additional assumptions can be made. (1) The channel estimate is perfect, i.e., estimated fade $\hat{h}_i$ equals the actual fade hi. (2) The input data xi has a Gaussian probability distribution function.

The probability that the received value is yi given that the transmitted signal is xi at power Es is $$Pr[y_i | E_s, x_i] = \frac{1}{\pi N_0} \exp \frac{-|y_i - \sqrt{E_s} h_i x_i|^2}{N_0}.$$

Under the Gaussian data assumption, the probability that yi is received when the transmit power is Es is $$\int Pr[y_i | E_s, x_i] Pr[x_i] dx = \frac{1}{\pi(N_0 + |h_i|^2 E_s)} \exp \frac{-|y_i|^2}{N_0 + |h_i|^2 E_s}.$$

The maximum likelihood (ML) estimate of Es maximizes this probability over all received symbols yi.

$$E_s^{ML} = \underset{E_s}{\operatorname{argmax}} \prod_i Pr[y_i | E_s] = \underset{E_s}{\operatorname{argmin}} \sum_i -\log Pr[y_i | E_s].$$

Setting the derivative of $$\sum_i -\log Pr[y_i | E_s]$$

to zero gives $$\sum_i \left[ \left(1 - \frac{|y_i|^2}{N_0 + |h_i|^2 E_s^{ML}}\right) \frac{|h_i|^2}{N_0 + |h_i|^2 E_s^{ML}} \right] = 0.$$

The receiver can solve the above equation to obtain the ML estimate of Es.

3.2 Total Received Energy Approximation

ML estimation is complex to implement in a mobile wireless communication device. An alternative is to compute the Total Received Energy (TRE) based on the following equation.

$$E_s^{TRE} = \frac{\sum_i (|y_i|^2 - N_0)}{\sum_i |h_i|^2}.$$

3.3 Weighted Received Energy Approximation

Another approximation involves computing a weighted mean of the received energy (WRE) based on the following equation.

$$E_s^{WRE} = \frac{\sum_i |h_i|^2 (|y_i|^2 - N_0)}{\sum_i |h_i|^4}.$$

The weighting need not be only by fade power $|h_i|^2$; it could be any function of $|h_i|$. The fade and noise values used are estimated values $\hat{h}_i$ and $\hat{N}_0$.

Pilot symbols may be transmitted without explicitly indicating the data symbol power in an overhead channel. The pilot symbols may be common for more than one user. The data symbols may be non-constant modulus symbols, such as, for example, 16QAM and 64QAM symbols. Further, different users may have different data symbol powers.

FIG. 4 is a flowchart of an exemplary method 400 of channel estimation for a wireless communication system according to one aspect of the present disclosure. The method 400 may be implemented in the multiple access wireless communication systems 100 of FIGS. 1 and 200 of FIG. 2. Pilot symbols transmitted by an access point, e.g., access point 146, are received in step 402. Traffic signal symbols transmitted by an access point are received in step 404. A pilot signal energy based on the received pilot symbols is estimated in step 406. An estimated traffic signal energy of the traffic signal symbols is estimated based on the received traffic signal symbols, the received pilot symbols and a noise estimate in step 408. A traffic to pilot ratio is determined based on the pilot signal energy and the traffic signal energy in step 410. The pilot and/or traffic signals may be orthogonal frequency division multiple access (OFDMA) signals.

Figure 5:
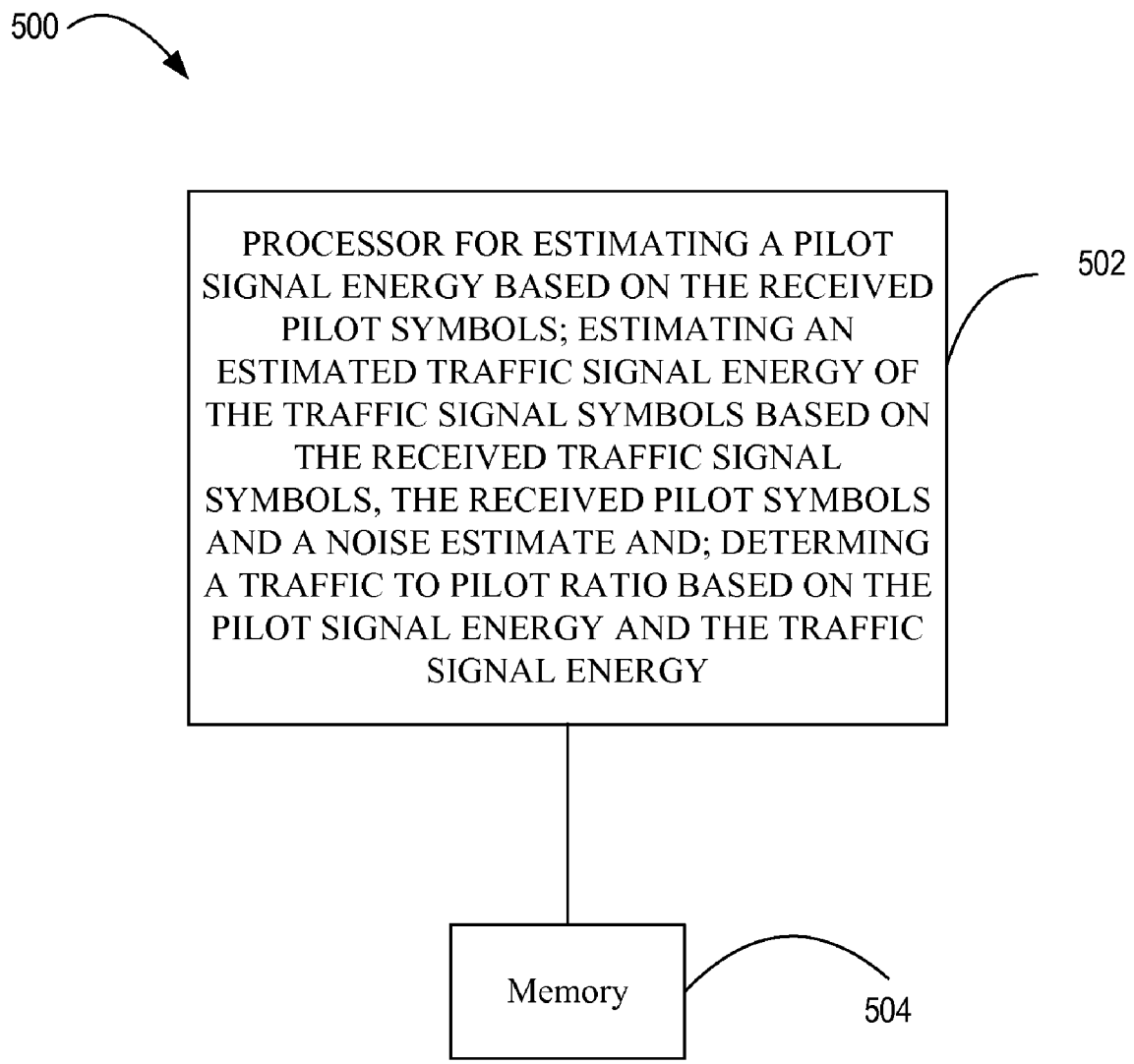
FIG. 5 is a block diagram of an apparatus of channel estimation for a wireless communication system according to one aspect of the present disclosure.

FIG. 5 is a block diagram of an apparatus 500 of channel estimation for a wireless communication system according to one aspect of the present disclosure. The apparatus 500 may include a processor 502 and a memory 504, which is coupled to the processor 502. The processor 502 may be configured to implement the methods illustrated in FIG. 4. Referring again to FIG. 5, processor 502 may be processor 230 or processor 270 in FIG. 2.

The present method may be carried out using various codes of one or more software modules forming a program and executed as instructions/data by, e.g., a central processing unit, or using hardware modules specifically configured and dedicated to perform the present method. Alternatively, in some embodiments, the present method may be carried out using a combination of software and hardware modules.

The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of channel estimation for a wireless communication device, comprising:
    receiving pilot symbols;
    receiving traffic signal symbols;
    estimating a pilot signal energy based on the received pilot symbols;
    estimating an estimated traffic signal energy of the traffic signal symbols based on the received traffic signal symbols, the received pilot symbols and a noise estimate; and
    determining a traffic to pilot ratio based on the pilot signal energy and the traffic signal energy for use in demodulation in the wireless communication device.

2. The method of claim 1, wherein the estimating the estimated traffic signal energy comprises:
    computing a total received energy.

3. The method of claim 2, wherein the computing the total received energy comprises:
    computing a sum of absolute values of received traffic signal symbols squared minus the noise estimate.

4. The method of claim 1, wherein the estimating the estimated traffic signal energy comprises:
    computing a weighted mean of a received energy.

5. The method of claim 4, wherein the computing the weighted mean of the received energy comprises:

computing a sum of absolute values of received traffic signal symbols squared minus the noise estimate.

6. The method of claim 4, wherein the estimating the estimated traffic signal energy of the traffic signal symbols based on the received traffic signal symbols, the received pilot symbols and a noise estimate comprises:

estimating an estimated maximum likelihood traffic signal energy of the traffic signal symbols based on the received traffic signal symbols, the received pilot symbols and the noise estimate.

7. An apparatus for channel estimation for a wireless communication device, comprising:

means for receiving pilot symbols;

means for receiving traffic signal symbols;

means for estimating a pilot signal energy based on the received pilot symbols;

means for estimating an estimated traffic signal energy of the traffic signal symbols based on the received traffic signal symbols, the received pilot symbols and a noise estimate; and means for determining a traffic to pilot ratio based on the pilot signal energy and the traffic signal energy.

8. The apparatus of claim 7, wherein the means for estimating the estimated traffic signal energy comprises:

means for computing a total received energy.

9. The apparatus of claim 8, wherein the means for computing the total received energy comprises:

means for computing a sum of absolute values of received traffic signal symbols squared minus the noise estimate.

10. The apparatus of claim 7, wherein the means for estimating the estimated maximum likelihood traffic signal energy comprises:

means for computing a weighted mean of a received energy.

11. The apparatus of claim 10, wherein the means for computing the weighted mean of the received energy comprises:

means for computing a sum of absolute values of received traffic signal symbols squared minus the noise estimate.

12. The apparatus of claim 7, wherein the means for estimating an estimated traffic signal energy of the traffic signal symbols based on the received traffic signal symbols, the received pilot symbols and a noise estimate comprises:

means for estimating an estimated maximum likelihood traffic signal energy of the traffic signal symbols based on the received traffic signal symbols, the received pilot symbols and the noise estimate.

13. An apparatus for channel estimation for a wireless communication device, the apparatus comprising:

at least one processor configured to:

receive pilot symbols;

receive traffic signal symbols;

estimate a pilot signal energy based on the received pilot symbols;

estimate an estimated maximum likelihood traffic signal energy of the traffic signal symbols based on the received traffic signal symbols, the received pilot symbols and a noise estimate; and determine a traffic to pilot ratio based on the pilot signal energy and the traffic signal energy.

14. The apparatus of claim 13, wherein the processor is configured to estimate the estimated maximum likelihood traffic signal energy by computing a total received energy.

15. The apparatus of claim 14, wherein processor is configured to compute the total received energy by computing a sum of absolute values of received traffic signal symbols squared minus the noise estimate.

16. The apparatus of claim 13, wherein the processor is configured to estimate the estimated maximum likelihood traffic signal energy by computing a weighted mean of a received energy.

17. The apparatus of claim 16, wherein the processor is configured to compute the weighted mean of the received energy by computing a sum of absolute values of received traffic signal symbols squared minus the noise estimate.

18. A computer program product, comprising:

a non-transitory computer-readable medium comprising:

code for receiving pilot symbols;

code for receiving traffic signal symbols;

code for estimating a pilot signal energy based on the received pilot symbols;

code for estimating an estimated maximum likelihood traffic signal energy of the traffic signal symbols based on the received traffic signal symbols, the received pilot symbols and a noise estimate; and code for determining a traffic to pilot ratio based on the pilot signal energy and the traffic signal energy.

19. The computer program product of claim 18, wherein the code for estimating the estimated maximum likelihood traffic signal energy comprises:

code for computing a total received energy.

20. The computer program product of claim 19, wherein the code for computing the total received energy comprises:

code for computing a sum of absolute values of received traffic signal symbols squared minus the noise estimate.

21. The computer program product of claim 18, wherein the code for estimating the estimated maximum likelihood traffic signal energy comprises:

code for computing a weighted mean of a received energy.

22. The computer program product of claim 21, wherein the code for computing the weighted mean of the received energy comprises:

code for computing a sum of absolute values of received traffic signal symbols squared minus the noise estimate.

* * * * *